United States Patent [19]

Lovrenich

[11] Patent Number: 4,761,598
[45] Date of Patent: Aug. 2, 1988

[54] TORQUE-ANGLE STABILIZED SERVO MOTOR DRIVE

[76] Inventor: Rodger T. Lovrenich, 209 Whispering Sands, Santa Teresa, N. Mex. 88008

[21] Appl. No.: 61,556

[22] Filed: Jun. 15, 1987

[51] Int. Cl.[4] .................................. G05B 19/40
[52] U.S. Cl. .................... 318/685; 318/696; 318/254
[58] Field of Search ............ 318/685, 696, 138, 254, 318/313

[56] References Cited

U.S. PATENT DOCUMENTS

| 3,766,458 | 10/1973 | Nishimura et al. | 318/313 |
| 4,426,608 | 1/1984 | Larson et al. | 318/685 |
| 4,439,717 | 3/1984 | Berney | 318/696 |
| 4,578,606 | 3/1986 | Welterlin | 310/68 R |
| 4,680,515 | 7/1987 | Crook | 318/318 |

Primary Examiner—William M. Shoop, Jr.
Assistant Examiner—Saul M. Bergmann
Attorney, Agent, or Firm—Barnes, Kisselle, Raisch, Choate, Whittemore & Hulbert

[57] ABSTRACT

A torque-angle stabilized servo motor drive which includes a constant current source and drive electronics responsive to step-control input signals for selectively applying current from the constant current source to the windings of a stepper motor. An encoder is coupled to the motor output shaft and provides a signal indicative of angular position of the rotor and shaft. Torque angle between the rotor and the magnetic field of the motor stator is determined as a function of a difference between the position-indicating encoder output and the control signals to the motor drive electronics, and such control signals are modified as a function of torque angle to obtain desired motion at the motor output shaft.

4 Claims, 2 Drawing Sheets

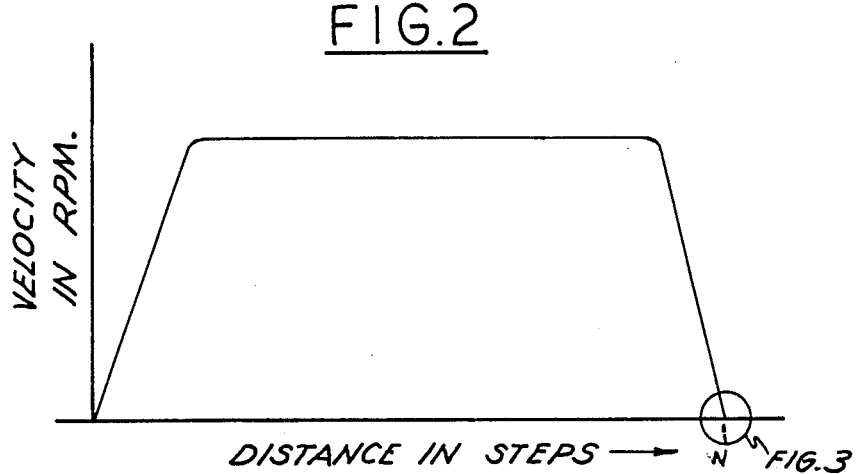
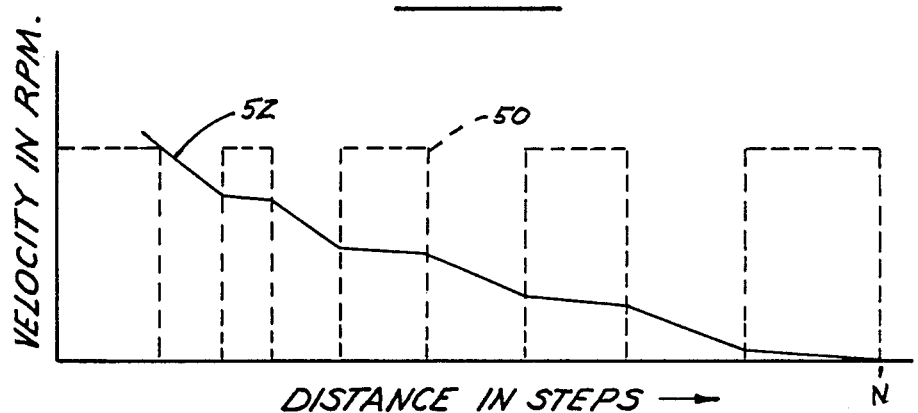

TORQUE-ANGLE STABILIZED SERVO MOTOR DRIVE

The present invention relates to systems for controlling automated production lines and the like, and more particularly to servo control of electric motors.

BACKGROUND AND OBJECTS OF THE INVENTION

Electric motors are employed in a number of applications in automated production lines. For example, such motors are employed for moving a workpiece transfer slide, or for moving a drill slide to drill a hole in a fixtured workpiece. In such applications, it is necessary accurately to control both position and velocity of the motor output and load to obtain desired production goals while reducing errors and waste. Conventional error-driven servo motor drives are characterized by slow response and/or overshoot and oscillation about the final desired position. In many applications, such as drilling a hole to a desired depth in a workpiece, the ability to control overshoot and oscillation is a limiting factor on accuracy and productivity.

It is therefore the general object of the present invention to provide an electric motor servo drive which is characterized by enhanced speed and accuracy as compared with like drives of the prior art. A more specific object of the invention is to provide a servo motor drive of the described type wherein motion of the motor and load is arrested at the desired position without overshoot or oscillation.

SUMMARY OF THE INVENTION

Briefly stated, in accordance with the present invention, the torque angle between the rotating magnetic field of the motor stator and actual position of the rotor and output shaft is measured and adjusted by control of the stator field angle to maintain motor stability, both during high speed motion and as motion is arrested at the final desired position. Torque applied to the rotor and output shaft of an electric motor is a direct function of stator current times the sine of the angle in electric degrees between the stator magnetic field and the rotor—i.e. the torque angle. In accordance with the present invention, stator current is maintained substantially constant, and rotor torque and motion are controlled by monitoring and controlling torque-angle. Thus, rotor and shaft motion is controlled independently of changing load on the motor output shaft.

In a preferred embodiment of the present invention herein disclosed, a power source includes a constant current source and drive electronics responsive to control signals for selectively applying current from the constant current source to the electric motor stator windings to control angular position of the rotatable stator magnetic field. Although the motor may comprise any suitable type of conventional motor, a stepper motor is preferred. The drive electronics may comprise any suitable conventional switching circuitry responsive to digital input signals for selectively applying constant current to the stator windings. An encoder is coupled to the motor output shaft for providing a signal indicative of angular position of the shaft and rotor. In the preferred embodiment of the invention, such encoder comprises an optical shaft encoder which provides quadrature squarewave output signals indicative of increments of shaft rotation. In accordance with an important feature of the present invention, the number of pulses in the position-indicating encoder output signal per revolution of the rotor and shaft is greater than, and an integral multiple of, the number of stator pole pairs in the motor, and thus an integral multiple of the number of stable step positions of the motor output.

Electronics circuitry monitors the control signals to the power drive electronics and the position-indicating output from the encoder to obtain a signal indicative of a difference between rotor and field angular positions. This difference signal is a direct measure of torque angle, and is employed to modify the control signals to the drive electronics so as to obtain desired motion at the motor output shaft and the load coupled thereto. In the preferred embodiment of the invention herein disclosed, the control signals to the drive electronics are obtained by comparing velocity at the motor output shaft, indicated by the shaft encoder, to an input velocity command, and providing the control signals to the power drive electronics as a combined function of torque angle and a difference between desired and actual motor velocities.

BRIEF DESCRIPTION OF THE DRAWINGS

The invention, together with additional objects, features and advantages thereof, will be best understood from the following description, the appended claims and the accompanying drawings in which:

FIGS. 2 and 3 are graphic illustrations useful in discussing operation of the embodiment of FIG. 1.

DETAILED DESCRIPTION OF PREFERRED EMBODIMENT

Figure 1:
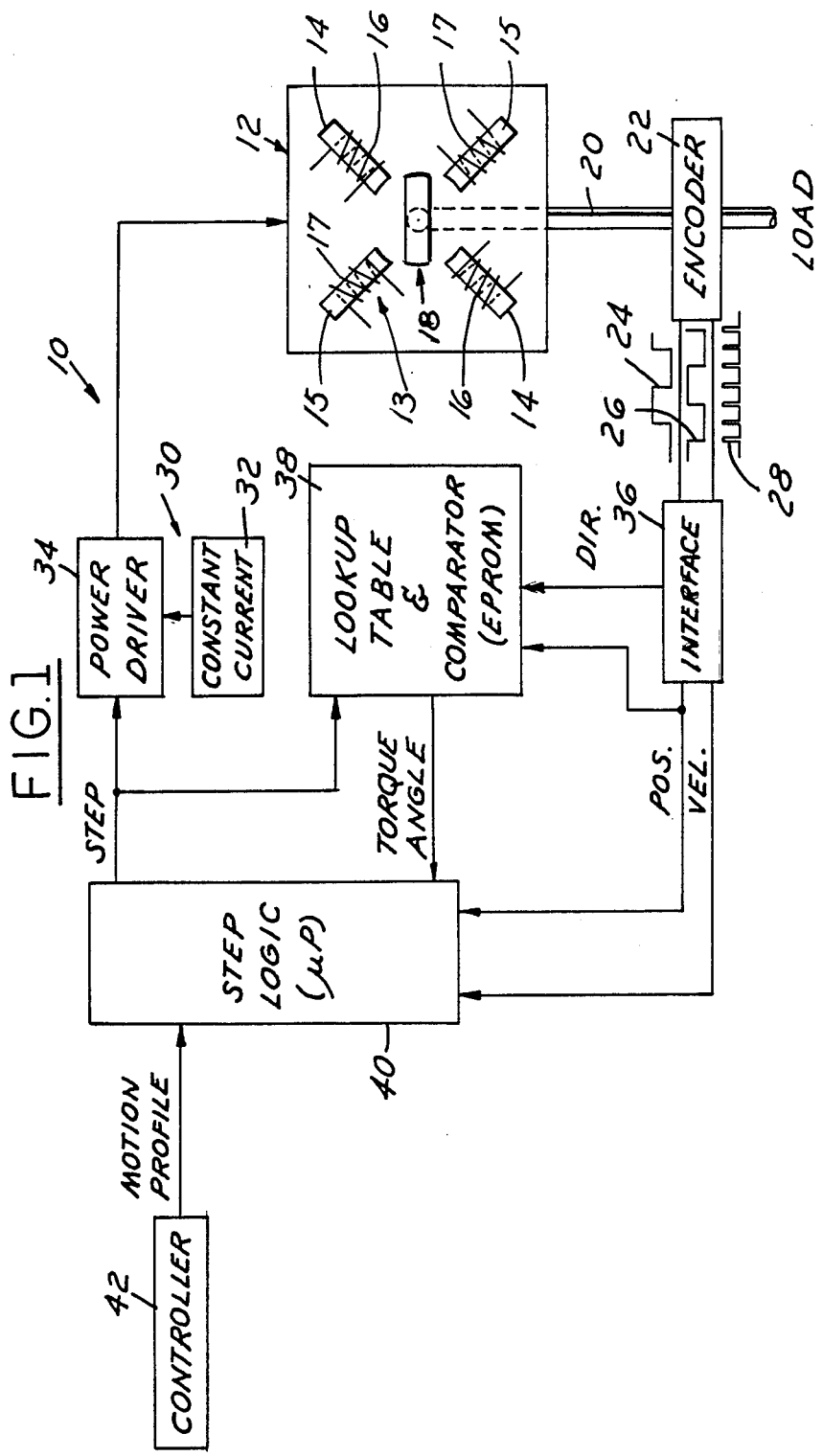
FIG. 1 is a functional block diagram of a presently preferred embodiment of a torque-angle stabilized servo motor drive in accordance with the invention.

FIG. 1 illustrates a torque-angle stabilized servo motor drive 10 in accordance with a presently preferred embodiment of the invention as including a stepper motor 12 having a stator 13 with paired pole pieces 14, 15 and associated windings 16,17. Typically, of course, motor 12 would comprise a multiplicity of stator poles pairs and windings, with only two pair being schematically illustrated in FIG. 1 for purposes of discussion. A permanent magnet rotor 18 is positioned in the usual manner to rotate within stator 13 and is coupled to an output shaft 20 for delivering motion to a load (not shown). An encoder 22, preferably an optical encoder, is coupled to shaft 20 to provide a pulsed periodic output signal indicative of angular increments of rotation of shaft 20 and rotor 18. In the preferred embodiment of the invention, encoder 22 provides quadrature sqaurewave output signals 24, 26. Such quadrature-output encoder is preferred both because direction of rotation can be directly determined from the phase relationship of the output signals, and because resolution can be enhanced electronically, as illustrated at 28, by triggering on the leading and trailing edges of both signals 24, 26.

A motor power source 30 includes a constant current source 32 and power drive electronics 34 responsive to step input control signals for selectively applying power from constant current source 32 to windings 16 of motor 12. In the preferred embodiment of the invention wherein motor 12 comprises a stepper motor, power drive electronics 34 may comprise suitable conventional switching electronics responsive to selection by the input control signal. An interface circuit 36 receives output signals 24, 26 from encoder 22 and provides outputs indicative of direction of shaft rotation, shaft position and shaft angular velocity, the latter being a function of the number of encoder position pulses per unit time. A look-up table and comparator EPROM 38 receives the step-control input signals to power drive electronics 34, and also receives the position- and direction-indicating outputs of interface 36. EPROM 38 thus monitors and compares electrical angle of the rotatable magnetic field at motor 12, indicated by the step-control input signal, and the actual position of rotor 18 and shaft 20, indicated by the position output of interface 36, and indicates torque angle as a function of the difference therebetween. The sign of the torque angle is, of course, a function of direction of rotation of the stator field indicated by the step-control input and actual direction of rotation indicated by the corresponding output from interface 36, and also indicates whether the rotor is leading or lagging the stator field.

A step logic microprocessor 40 receives motion command input signals from a controller 42. Microprocessor 40 also receives the position- and velocity-indicating outputs of interface circuit 36, and the torque angle-indicating output of EPROM 38. Microprocessor 40 is responsive to a difference in desired motion indicated by the input from controller 42 and actual motion indicated by inputs from interface 36, and to torque-angle input from EPROM 38 to provide step-control output signals to power drive electronics 34.

FIG. 2 and 3 graphically illustrate operation of the invention. In particular, FIG. 2 illustrates an exemplary motion profile received from controller 42 and prestored in step logic microprocessor 40. The motion profile of FIG. 2 indicates an increase in velocity, as a function of output position or distance in angular increments or steps, to a constant velocity for a number of output steps, followed by deceleration to zero velocity at a total number of steps N. Operation of the invention in arresting motion of the rotor and shaft at position N is illustrated in greater detail in FIG. 3. In particular, field angle, indicated by phantom lines 50, and consequent torque angle between the field and rotor, is alternately switched back and forth between adjacent stator pole pairs to smoothly arrest motion of armature 18 therebetween, as indicated by solid line 52. It will be appreciated, of course, that field angle is variable only in angular increments, with the increments depending upon the number of stator pole pairs. Thus, to slow motion of rotor 18 between adjacent pairs, field angle is switched back and forth between such adjacent pairs as illustrated at 50 in FIG. 3, with the duty cycle varying as a direct function of rotor velocity. In this way, rotor velocity is arrested at desired final position N without overshoot or oscillations.

The invention claimed is:

1. A torque-angle stabilized servo drive comprising:
an electric motor having a stator with a plurality of pole pairs and electrical windings for producing a rotatable magnetic field, and a rotor coupled to a motor output shaft,
a power source including a constant current source and drive means responsive to control signals for selectively applying current from said constant current source to said windings to control angular position of said rotatable magnetic field,
position encoder means coupled to said motor output shaft for providing a pulsed signal indicative of increments of rotor and shaft rotation, the number of pulses in said increment-indicative pulsed signal per revolution of said rotor and shaft being greater than, and an integral multiple of, the number of said pole pairs,
means coupled to said encoder means and responsive to said pulsed signal to produce signals which indicate angular position of said rotor and shaft,
means for comparing said control signals to said signals which indicate angular position of said rotor and shaft to obtain a difference signal indicative of torque angle between said rotor and said field, and
means responsive to said difference signal for providing said control signals to said power source.

2. The servo drive set forth in claim 1 wherein said means for providing said control signals comprises means for receiving a velocity command signal indicative of desired velocity at said rotor and shaft,
means responsive to said pulsed increment-indicative signals for indicating actual velocity of said rotor and shaft, and
means for providing said control signals to said power sources as a combined function of said difference signal, and a difference between said desired and actual velocities.

3. The servo drive set forth in claim 2 wherein said motor comprises a stepper motor.

4. The servo drive set forth in claim 3 wherein said integral multiple is eight.

* * * * *